(12) United States Patent  (10) Patent No.: US 7,021,069 B2
Taira  (45) Date of Patent: Apr. 4, 2006

(54) MULTIPLE REFRIGERATING DEVICE

(75) Inventor: Shigeharu Taira, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 83 days.

(21) Appl. No.: 10/363,989

(22) PCT Filed: Sep. 10, 2001

(86) PCT No.: PCT/JP01/07847

§ 371 (c)(1),
(2), (4) Date: Mar. 10, 2003

(87) PCT Pub. No.: WO02/23100

PCT Pub. Date: Mar. 21, 2002

(65) Prior Publication Data

US 2004/0011062 A1    Jan. 22, 2004

(30) Foreign Application Priority Data

Sep. 11, 2000  (JP) .............................. 2000-275115

(51) Int. Cl.
*C09K 5/00* (2006.01)
(52) U.S. Cl. ............................... 62/149; 62/77; 252/67
(58) Field of Classification Search ................. 62/77, 62/114, 252
See application file for complete search history.

(56) References Cited

U.S. PATENT DOCUMENTS

| | | | |
|---|---|---|---|
| 3,336,763 A | | 8/1967 | Lunde |
| 4,309,296 A | | 1/1982 | Enjo et al. |
| 5,092,138 A | * | 3/1992 | Radermacher et al. ........ 62/502 |
| 5,243,837 A | * | 9/1993 | Radermacher et al. ........ 62/513 |
| 6,477,848 B1 | * | 11/2002 | Domyo et al. ................ 62/114 |
| 6,591,631 B1 | | 7/2003 | Taira |

FOREIGN PATENT DOCUMENTS

| | | |
|---|---|---|
| EP | 0877599 A1 | 12/1998 |
| EP | 1223389 A1 | 7/2002 |
| JP | 6-101940 A | 4/1994 |
| JP | 6-117736 A | 4/1994 |
| JP | 6-256757 A | 9/1994 |
| JP | 9-31450 A | 2/1997 |
| JP | 11-270918 A | 10/1999 |
| JP | 2000-257974 | * 9/2000 |
| KR | 2002-0070969 A | 9/2002 |
| WO | WO 01/29490 A1 | 4/2001 |

OTHER PUBLICATIONS

Domyo et al., Refrigerating Device, Aug. 09, 2000, WO00/52396, p. 3, FIG. 3.*
R. Yajima et al.: "The performance evaluation of HFC alternative refrigerants for HCFC-22"; *Proceedings Padua Meeting IIR*, Sep. 21, 1994, Sep. 23, 1994, pp. 239-247.
*Patent Abstracts of Japan*, vol. 1998, No. 11, Sep. 30, 1998, & JP 10 170081 A.

* cited by examiner

*Primary Examiner*—William C. Doerrier
(74) *Attorney, Agent, or Firm*—Birch, Stewart, Kolasch & Birch, LLP

(57) ABSTRACT

A multi-type refrigerator is capable of achieving a high coefficient of performance (COP) while using R32 as refrigerant and that takes account of energy saving and global warming. Refrigerating cycles are executed by circulation of R32 as refrigerant through a refrigerant circuit including one outdoor unit having a compressor, a condenser, and expansion means and a plurality of indoor units having evaporators. A filling quantity of R32 for the refrigerant circuit is set in a range from 120 to 300 g/kW (refrigerating capacity). The filling quantity of R32 for the refrigerant circuit is set in a range from 84 to 300 g/L (internal volume of the condenser).

4 Claims, 6 Drawing Sheets

MULTIPLE REFRIGERATING DEVICE

This application is the National Phase 37 CFR §371 of PCT International Application No. PCT/JP01/07847 which has an International filing date of Sep. 10, 2001, which designated the United States of America.

1. Technical Field

The present invention relates to a multi-type refrigerator having an outdoor unit and indoor units in one-to-plurality correspondence, and more particularly to a multi-type refrigerator in which R32 (having a chemical formula $CH_2F_2$) or mixed refrigerant containing at least 70 percent R32 by weight is used as alternative refrigerant to R22 (having a chemical formula $CHClF_2$)

2. Background Art

Among global environmental problems on refrigerators, air conditioners, and the like that execute refrigerating cycles with use of refrigerant are (1) ozonosphere protection, (2) energy saving, (3) countermeasures against global warming (reduction of emission of $CO_2$ and the like), (4) reuse (recycling) of resources, and the like.

R22 (HFC22) that has conventionally been used has a high ODP (Ozone Depletion Potential) and is not suitable refrigerant, especially, in terms of ozonosphere protection among the global environmental problems. As alternative refrigerant to R22, there have been listed R410A (HFC32: HFC125=50:50 (by weight)), R407C (HFC32:HFC125: HFC134a= 23:25:52 (by weight)) and the like. Among refrigerators that execute refrigerating cycles with use of R410A, R407C, or the like, refrigerators that have achieved COP (Coefficient of Performance) equivalent to COP obtained by R22 have already been commercialized.

As for energy saving, there has been a notice that COP of specified air conditioners must be increased by approximately 4 percent not later than the end of September in the year 2004 (Notice No. 190 from the Ministry of International Trade and Industry of Japan, based upon "the Law concerning the Rational Use of Energy"). Thus refrigerant having a large COP value is required to be used from viewpoint of energy saving.

Requirements for prevention of global warming have been getting increasingly stringent. Refrigerators, air conditioners, and the like are evaluated with use of an index on global warming that is referred to as TEWI (Total Equivalent Warming Impact). TEWI is represented as the total of Global Warming Potential (GWP) and the inverse of COP. Accordingly, in order to prevent global warming, refrigerant having a small GWP and a large COP has to be selected to decrease TEWI.

As refrigerant suitable for prevention of global warming may be listed R32 having a small global warming potential GWP. R32 has a GWP about one-third that of R22, R407C or R410A, which is extremely effective for prevention of global warming.

As for COP of R32, COP value of R32 larger than that of R22 has not been obtained, while COP values of R407C and R410A are generally equivalent to COP value of R22. That is to say, refrigerators that execute refrigerating cycles with use of R32 have not actually achieved COP values that greatly exceed COP of R22, though such refrigerators are theoretically expected to have high COP values in view of characteristics of R32. Besides, there occur phenomena such as increase in pressure and discharge temperature relative to those with use of R22. In addition, slightly flammable R32 has a problem of difficulty in establishing a consensus on safety thereof. Therefore, the industrial world has never employed R32 as alternative refrigerant for actual products.

DISCLOSURE OF INVENTION

An object of the present invention is to provide a multi-type refrigerator that is capable of achieving a high coefficient of performance (COP) while using R32 as refrigerant and that takes account of energy saving and global warming.

The invention was created on basis of finding by the inventor that trends of change in COP of refrigerators in response to quantity of refrigerant (total filling quantity for a refrigerant circuit) greatly differed among types of refrigerant, i.e., between R32 and other refrigerants such as R410A. Specifically, in use of R410A as shown in FIG. 1A, COP of R410A tends to increase gradually and to seem to become saturated with increase in the quantity of refrigerant in a range shown in the drawing. In use of R32, by contrast, COP of R32 tends to reach its peak with change in the quantity of refrigerant and tends to decrease while the quantity of refrigerant is out of a range that provides the peak. The reason why COP obtained with use of R32 has not exceeded COP obtained with use of R410A is that quantity of the refrigerant has been in a comparatively high range (from 1200 to 1300 g in an example of FIG. 1A). It should be noted that the peak value of COP with change in quantity of refrigerant with use of R32 is much larger than COP with use of R410A in an optimal quantity of refrigerant (1300 g in the example of FIG. 1A). It is thus found that a high COP may be obtained when the quantity of the refrigerant R32 is set in an appropriate range.

It has been found that R32 has GWP far lower and provides COP higher than conventional R22 and R410A, and therefore, R32 has TEWI value lower than R22 or R410A to exhibit an excellent characteristic on global warming.

The multi-type refrigerator of the invention that executes refrigerating cycles by circulating R32 as refrigerant through a refrigerant circuit including one outdoor unit having a compressor, a condenser, and expansion means and a plurality of indoor units having evaporators is characterized in that a filling quantity of above-mentioned R32 for the refrigerant circuit is in a range from 120 g to 300 g per kilowatt of refrigerating capacity.

Thus high COP is obtained on condition that the filling quantity of R32 for the refrigerant circuit is in the range from 120 g to 300 g per kilowatt of refrigerating capacity.

The multi-type refrigerator of the invention that executes refrigerating cycles by circulating R32 as refrigerant through the refrigerant circuit including one outdoor unit having the compressor, the condenser, and the expansion means and a plurality of indoor units having the evaporators is characterized in that the filling quantity of above-mentioned R32 for the refrigerant circuit is in a range from 84 g to 300 g per liter of internal volume of the condenser.

Thus high COP is obtained on condition that the filling quantity of R32 for the refrigerant circuit is in the range from 84 g to 300 g per liter of internal volume of the condenser.

The multi-type refrigerator of the invention that executes refrigerating cycles by circulating mixed refrigerant containing at least 70 percent R32 by weight through the refrigerant circuit including one outdoor unit having the compressor, the condenser, and the expansion means and a plurality of indoor units having the evaporators is characterized in that a filling quantity of above-mentioned R32 for the refrigerant circuit is in a range from 370 g to 700 g per kilowatt of refrigerating capacity.

With use of mixed refrigerant containing at least 70 percent R32 by weight, high COP is obtained on condition that the filling quantity of R32 for the refrigerant circuit is in the range from 370 g to 700 g per kilowatt of refrigerating capacity.

The multi-type refrigerator of the invention that executes refrigerating cycles by circulating mixed refrigerant containing at least 70 percent R32 by weight through the refrigerant circuit including one outdoor unit having the compressor, the condenser, and the expansion means and a plurality of indoor units having the evaporators is characterized in that the filling quantity of above-mentioned R32 for the refrigerant circuit is in a range from 260 g to 700 g per liter of internal volume of the condenser.

With use of mixed refrigerant containing at least 70 percent R32 by weight, high COP is obtained on condition that the filling quantity of R32 for the refrigerant circuit is in the range from 260 g to 700 g per liter of internal volume of the condenser.

BEST MODE FOR CARRYING OUT THE INVENTION

Figure 1A:
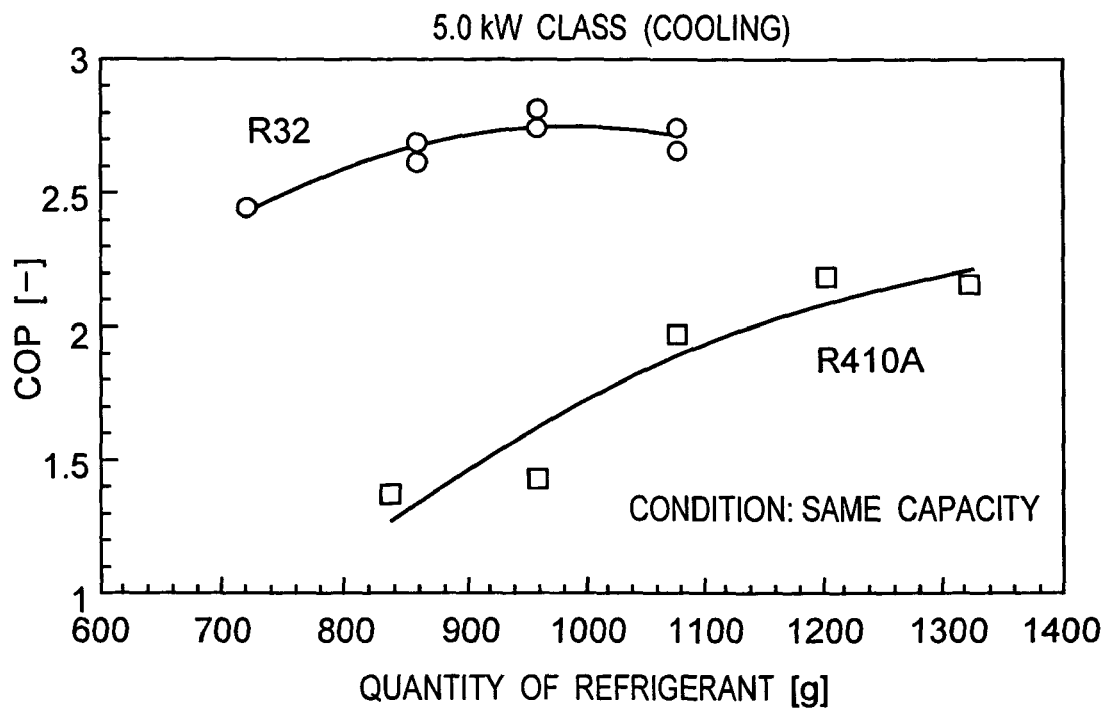
FIGS. 1A and 1B are diagrams showing results of measurement of COP with use of R32 as refrigerant and COP with use of R410A, with variation in quantity of refrigerant (total quantity for filling a refrigerant circuit), FIG. 1A showing the results in cooling operation, FIG. 1B showing the results in heating operation.

Hereinbelow, a refrigerator of the invention will be described in detail with reference to a preferred embodiment shown in the drawings.

Figure 2:
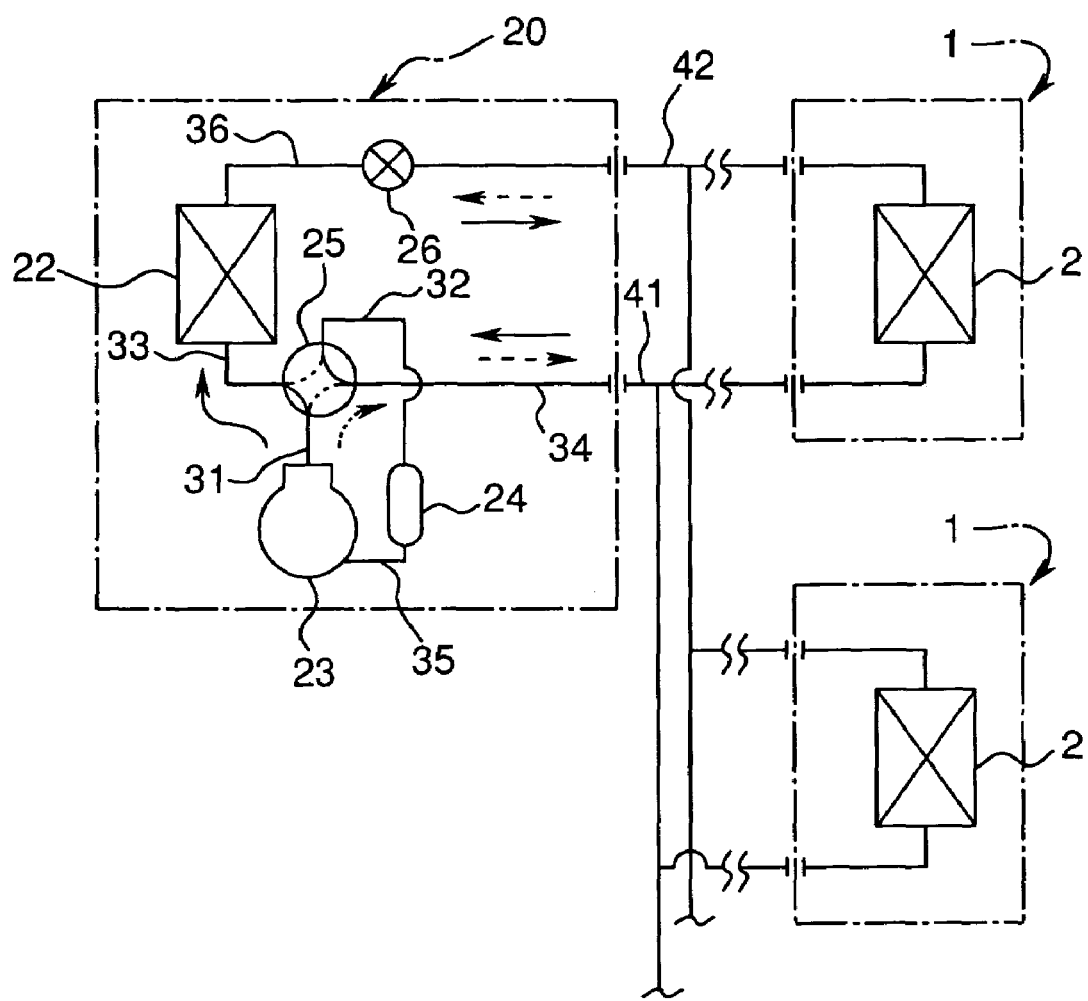
FIG. 2 is a diagram showing a schematic configuration of a multi-type heat pump air conditioner of an embodiment in accordance with an application of the invention.

FIG. 2 shows a schematic configuration of a multi-type heat pump air conditioner of an embodiment in accordance with an application of the invention. In the air conditioner, a refrigerant circuit is composed of one outdoor unit 20 and a plurality of indoor units 1 that are connected by refrigerant pipes 41 and 42, and R32 as refrigerant is circulated through the refrigerant circuit. In each indoor unit 1 is housed an indoor heat exchanger 2. In the outdoor unit 20 are housed a compressor 23 for compressing and discharging refrigerant (R32), a four-way directional control valve 25 for switching refrigerant passes, an outdoor heat exchanger 22, a motor-operated expansion valve 26, and an accumulator 24 for gas-liquid separation of returned refrigerant.

In cooling operation in which refrigerating cycles are executed, as shown by solid lines in FIG. 2, refrigerant discharged from the compressor 23 is delivered through a pipe 31, the four-way directional control valve 25, and a pipe 33 to the outdoor heat exchanger 22 functioning as a condenser, according to a switch setting of the four-way directional control valve 25. The refrigerant condensed in the outdoor heat exchanger 22 is delivered through a pipe 36, the expansion valve 26 that throttles a pass to expand refrigerant, and the pipes 42 to the indoor heat exchangers 2 functioning as evaporators. The refrigerant vaporized in the indoor heat exchangers 2 is returned to the compressor 23 through the pipes 41, a pipe 34, the four-way directional control valve 25, a pipe 32, the accumulator 24, and a pipe 35. In heating operation, the four-way directional control valve 25 is switched over and, as shown by dashed lines in FIG. 2, refrigerant discharged from the compressor 23 is delivered through the pipe 31, the four-way directional control valve 25, the pipe 34, and the pipes 41, to the indoor heat exchangers 2 functioning as the condensers. The refrigerant condensed in the indoor heat exchanger 2 is delivered to the pipes 42, the expansion valve 26 being completely open, the pipe 36, and the outdoor heat exchanger 22 functioning as the evaporator. The refrigerant vaporized in the outdoor heat exchanger 22 is returned through the pipe 33, the four-way directional control valve 25, the pipe 32, the accumulator 24, and the pipe 35 to the compressor 23.

Figure 4A:
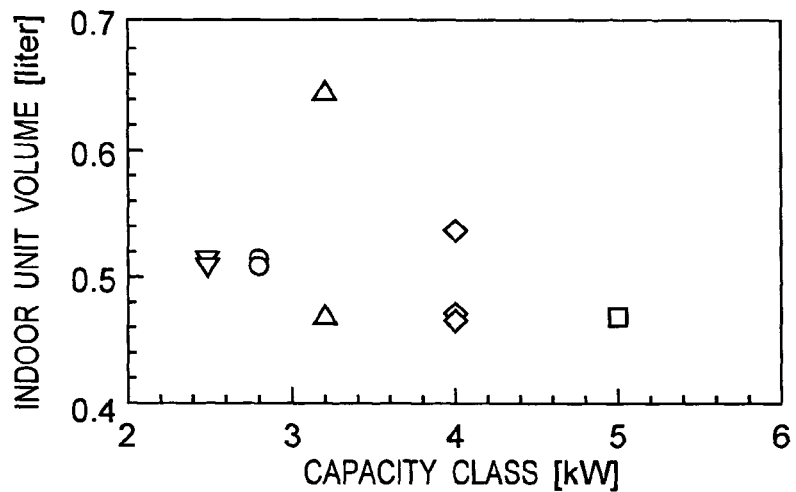
FIGS. 4A, 4B, and 4C are diagrams showing set values of an internal volume of an indoor heat exchanger and an internal volume of an outdoor heat exchanger of the air conditioner.
Figure 4B:
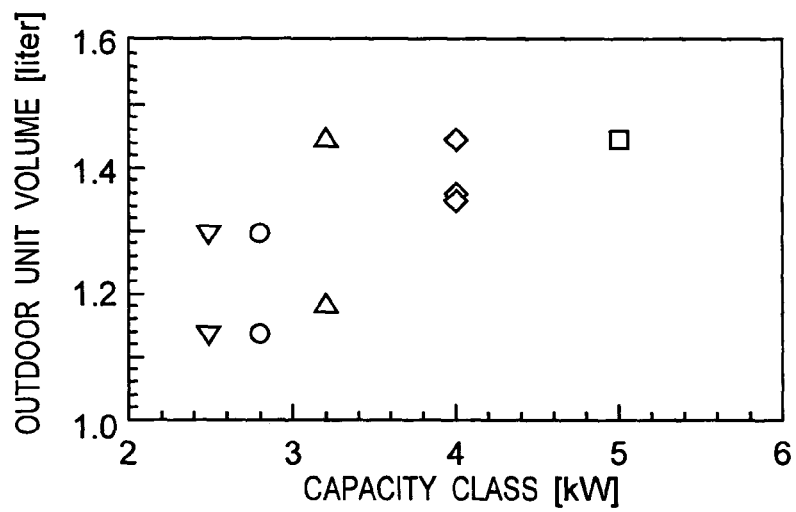
Figure 4C:
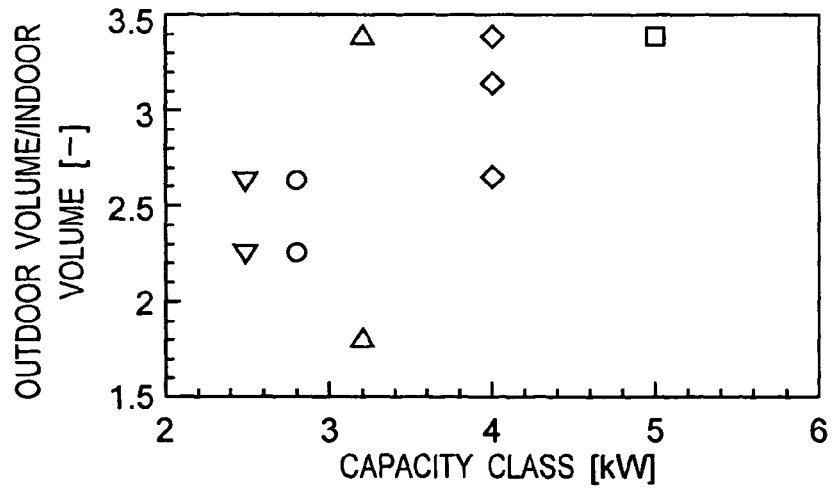

In order to evaluate coefficients of performance (COP) of the air conditioner, the inventor variously set internal volumes of the indoor heat exchangers 2 and internal volumes of the outdoor heat exchanger 22 with respect to different capacity classes from 2.2 kW to 5.0 kW, as shown in FIGS. 4A and 4B. FIG. 4C shows ratios of the internal volumes of the outdoor heat exchanger 22 to the internal volumes of the indoor heat exchangers 2. Internal volumes of the whole refrigerant circuit vary according to setting of the internal volumes of the indoor heat exchangers 2 and of the internal volumes of the outdoor heat exchanger 22.

Figure 1B:
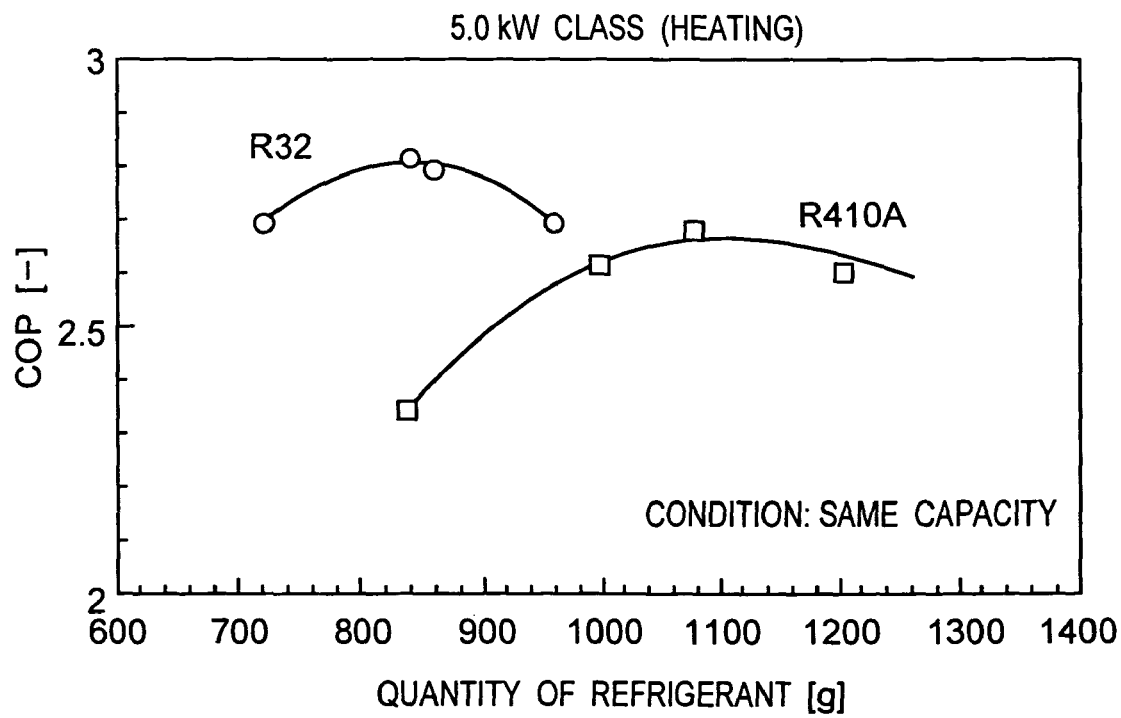

In 5.0 kW class, for example, the internal volume of the outdoor heat exchanger 22 was set at 1.45 liters and the internal volume of the indoor heat exchanger 2 was set at 0.47 liter. COP in 5.0 kW class was measured with variation in quantity of refrigerant (total quantity for filling the refrigerant circuit) and results as shown in FIGS. 1A and 1B were obtained. FIG. 1A shows COP in cooling operation and FIG. 1B shows COP in heating operation. In cooling operation, as is evident from FIG. 1A, COP exhibited peak values as high as 2.7 to 2.8 on condition that the quantity of R32 refrigerant was 960 g. By contrast, COP of an air conditioner having the same capacity of 5.0 kW with use of R410A was 2.2 at maximum (on condition that the quantity of refrigerant was 1300 g).

Thus a range of quantity of refrigerant providing COP peak on various conditions with use of R32 was determined by an experiment. High COP was obtained on condition that a filling quantity of single refrigerant R32 in the multi-type air conditioner was in a range from 120 g to 300 g per kilowatt of refrigerating capacity. High COP was obtained on condition that the filling quantity of single refrigerant R32 for the refrigerant circuit of the multi-type air conditioner was in a range from 84 g to 300 g per liter of internal volume of the condenser.

Figure 3A:
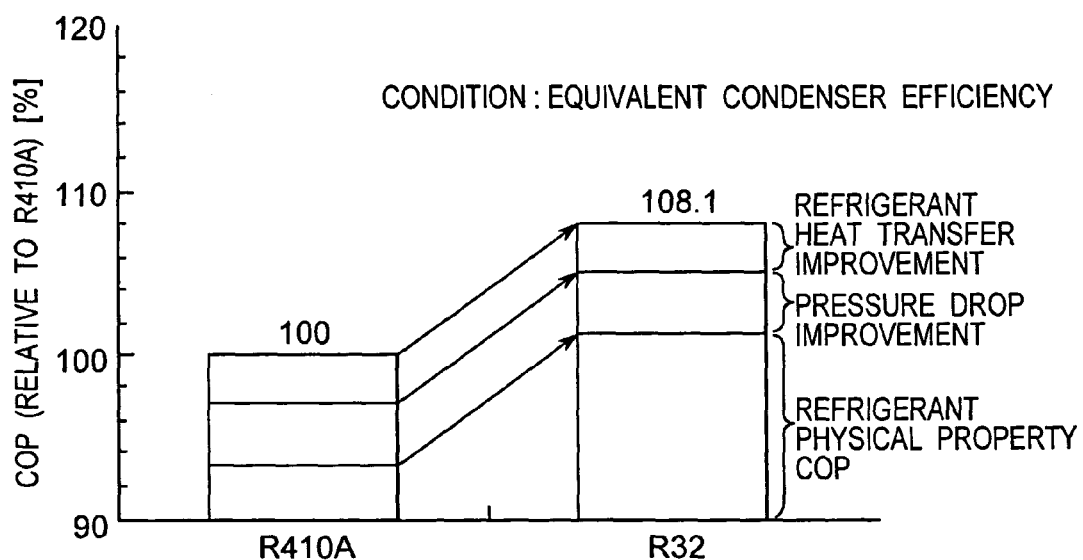
FIGS. 3A and 3B are diagrams showing comparison between COP with use of R32 and COP with use of R410A on condition that capacities are the same (efficiencies of condensers are equivalent)
Figure 3B:
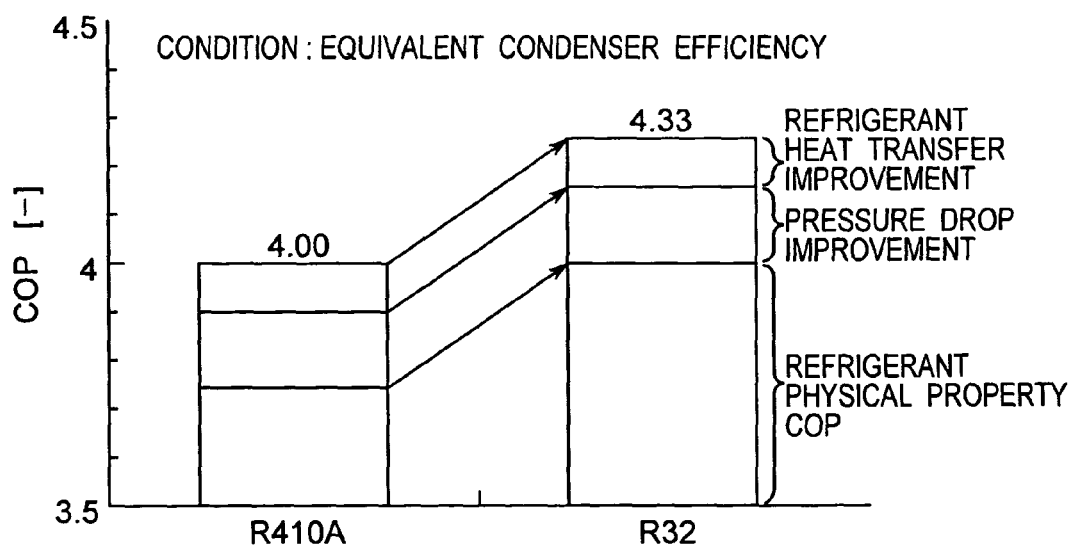

On condition that the capacities were the same (efficiencies of the condensers were equivalent) in a range from 2.2 kW to 5.0 kW, comparison between COP with use of R32 and COP with use of R410A provided results as shown in FIGS. 3A and 3B. The quantity of refrigerant in the case that R32 was used was optimized in a range from 60% to 80% by weight of the quantity of refrigerant in the case that R410A was used. FIG. 3A shows that COP with use of R32 was 108.1(%) relative to COP (100%) with use of R410A. FIG. 3B shows that COP with use of R410A was 4.00 whereas COP with use of R32 was 4.33. As is evident from those, COP that is obtained with use of R32 and with the quantity of refrigerant set in an appropriate range may be much higher than COP with use of R410A. Among factors that thus improve COP are improvement based on little pressure drop and improvement based on improvement in heat transfer in the refrigerant and, in addition to improvement based on physical properties of the refrigerant.

From FIGS. 1A and 1B, an optimum quantity of refrigerant that provides COP peak in use of R32 is found to be 960 g in cooling operation and to be 840 g in heating operation. On the other hand, an optimum quantity of refrigerant in use of R410A is found to be 1300 g in cooling operation and to be 1100 g in heating operation. With use of R32, as is evident from these results, a ratio between optimum quantities of refrigerant in cooling operation and in heating operation is closer to 1 than the ratio with use of R410A. Consequently, refrigerant vessels for adjustment between cooling and heating may be made unnecessary or a capacity of the accumulator may be decreased in the case of R32.

Figure 6:
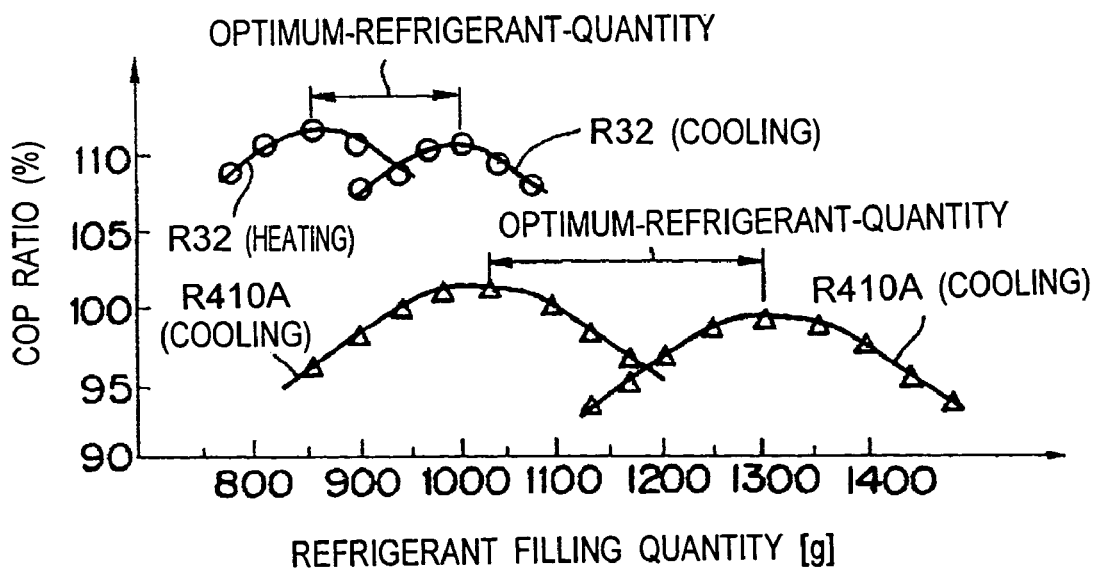
FIG. 6 is a diagram showing relationship between COP and filling quantities of refrigerant about R32 and R410A in cooling operation and heating operation.
Figure 7:
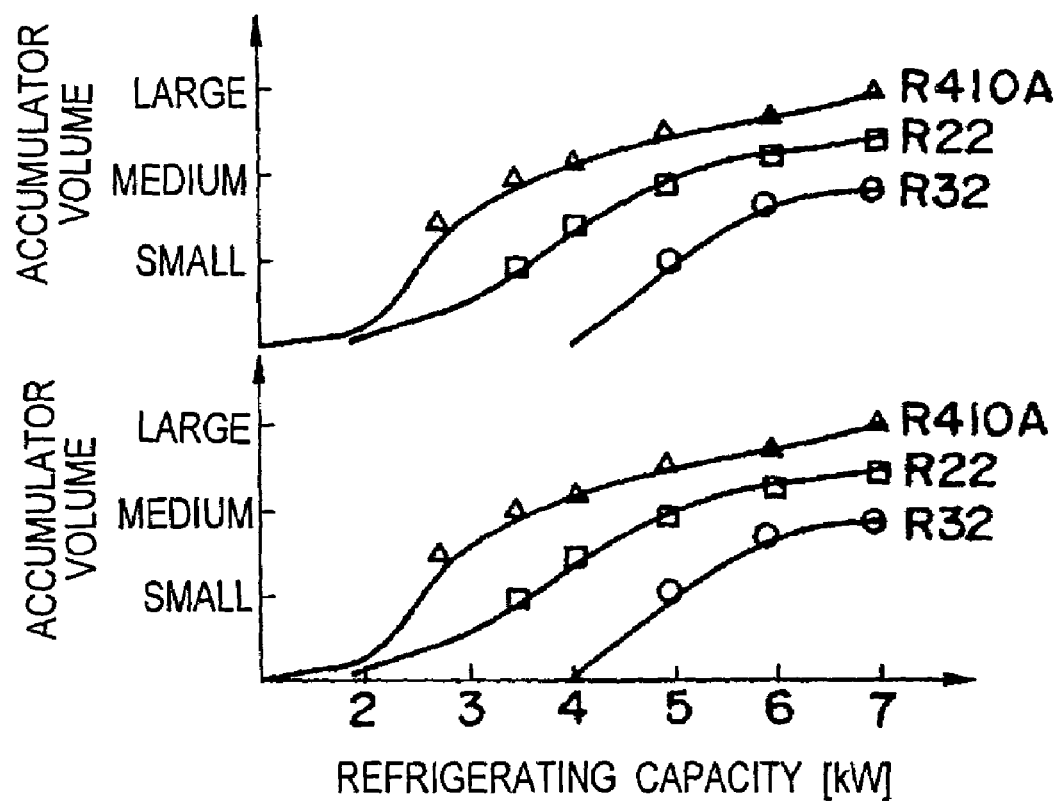
FIG. 7 is a diagram showing volumes of accumulators and receivers that correspond to refrigerating capacities of refrigerants R32, R410A, and R22.

FIG. 6 shows differences between optimum quantities of refrigerant in cooling and heating operations, with use of FIGS. 1A and 1B. As shown in FIG. 6, a difference between the optimum quantity of R32 refrigerant in cooling operation and the optimum quantity of R32 refrigerant in heating operation is smaller than that of R410A. R32 achieves a high COP with a smaller filling quantity of refrigerant in comparison with R410A. That is, R32 has a higher heat transfer capacity in comparison with R410A refrigerant. Thus R32 provides the smaller difference between the optimum quantity of refrigerant in cooling operation and the optimum quantity of refrigerant in heating operation in comparison with R410A refrigerant, and achieves a high COP with smaller filling quantity of refrigerant in comparison with R410A. Therefore, R32 allows reduction in quantity of refrigerant for use in an air conditioner. FIG. 7 shows volumes of accumulators and receivers that correspond to refrigerating capacities with regard to refrigerants R32, R410A, and R22. As shown in FIG. 7, air conditioners with refrigerating capacities not higher than 4 kW do not require accumulators and receivers. That is, air conditioners with use of R32, which do not require accumulators and receivers, allow reduction in cost of manufacturing the air conditioners and miniaturization of the air conditioners.

The embodiment has been described as to heat pump air conditioners but is not limited to those. The invention may be applied generally to apparatus that execute refrigerating cycles with use of R32 as refrigerant.

As a matter of course, principles of the invention may be applied not only to single refrigerant of R32 but also extensively to mixed refrigerant containing at least 70 percent R32 by weight.

In an experiment by the inventor where mixed refrigerant containing at least 70 percent R32 by weight was used in the multi-type air conditioner, high COP was obtained on condition that the filling quantity of R32 in the mixed refrigerant for the refrigerant circuit was in a range from 370 g to 700 g per kilowatt of refrigerating capacity. When mixed refrigerant containing at least 70 percent R32 by weight was used in the multi-type air conditioner, high COP was obtained on condition that the filling quantity of R32 in the mixed refrigerant for the refrigerant circuit was in a range from 260 g to 700 g per liter of internal volume of the condenser.

Figure 5:
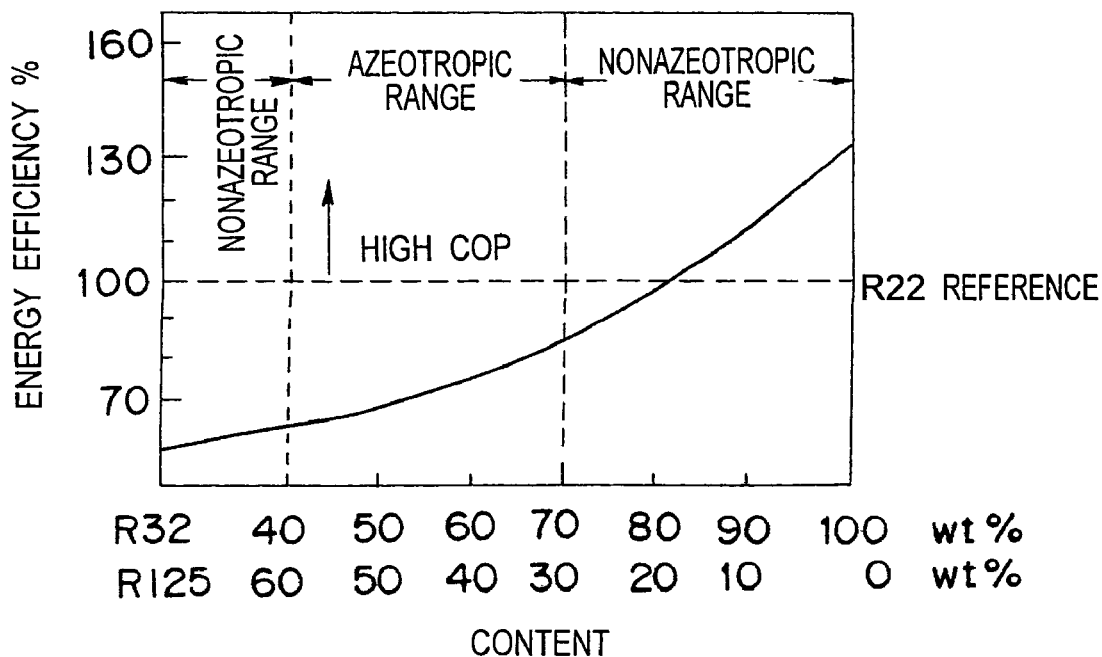
FIG. 5 is a diagram showing relationship between R32 contents in refrigerant of R32 mixed with R125 and energy efficiencies.

As the mixed refrigerant, a mixture of R32 and R125 is conceivable. As for the mixed refrigerant of R32 and R125, as shown in FIG. 5, an R32 content range of up to 70 percent by weight is an azeotropic range in which composition of liquid and composition of generated vapor are the same, and an R32 content range not smaller than 70 percent is a nonazeotropic range. Characteristics of R32 appear clearly with increase in content of R32, and the characteristics of R32 appear further conspicuously in the nonazeotropic range. That is, R32 content not less than 70 percent by weight causes a remarkable increase in energy efficiency and makes it possible to obtain a high COP.

As shown in FIGS. 1A, 1B, and 5, mixed refrigerant containing at least 70 percent R32 by weight thus makes COP generally equivalent to or larger than that provided by conventional refrigerant such as R22.

What is claimed is:

1. A multi-type refrigerator that executes refrigerating cycles by circulating R32 as refrigerant through a refrigerant circuit including one outdoor unit having a compressor, a condenser, and expansion means and a plurality of indoor units having evaporators, the multi-type refrigerator characterized in that a filling quantity of R32 described above for the refrigerant circuit is in a range from 120 g to 300 g per kilowatt of refrigerating capacity.

2. A multi-type refrigerator that executes refrigerating cycles by circulating R32 as refrigerant through a refrigerant circuit including one outdoor unit having a compressor, a condenser, and expansion means and a plurality of indoor units having evaporators, the multi-type refrigerator characterized in that a filling quantity of R32 described above for the refrigerant circuit is in a range from 84 g to 300 g per liter of internal volume of the condenser.

3. A multi-type refrigerator that executes refrigerating cycles by circulating mixed refrigerant containing at least 70 percent R32 by weight through a refrigerant circuit including one outdoor unit having a compressor, a condenser, and expansion means and a plurality of indoor units having evaporators, the multi-type refrigerator characterized in that a filling quantity of R32 described above for the refrigerant circuit is in a range from 370 g to 700 g per kilowatt of refrigerating capacity.

4. A multi-type refrigerator that executes refrigerating cycles by circulating mixed refrigerant containing at least 70 percent R32 by weight through a refrigerant circuit including one outdoor unit having a compressor, a condenser, and expansion means and a plurality of indoor units having evaporators, the multi-type refrigerator characterized in that a filling quantity of R32 described above for the refrigerant circuit is in a range from 260 g to 700 g per liter of internal volume of the condenser.

* * * * *